United States Patent
Tanimoto

(10) Patent No.: US 11,695,137 B2
(45) Date of Patent: Jul. 4, 2023

(54) FUEL CELL VEHICLE AND METHOD OF STOPPING THE SAME

(71) Applicant: HONDA MOTOR CO., LTD., Tokyo (JP)

(72) Inventor: Satoshi Tanimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 14 days.

(21) Appl. No.: 17/526,536

(22) Filed: Nov. 15, 2021

(65) Prior Publication Data
US 2022/0166040 A1 May 26, 2022

(30) Foreign Application Priority Data
Nov. 20, 2020 (JP) .............................. JP2020-193184

(51) Int. Cl.
*H01M 8/04303* (2016.01)
*H01M 8/04858* (2016.01)
(Continued)

(52) U.S. Cl.
CPC ......... *H01M 8/04303* (2016.02); *B60L 58/33* (2019.02); *H01M 8/0494* (2013.01); *H01M 8/04126* (2013.01); *H01M 8/04768* (2013.01); *H01M 8/04992* (2013.01); *H01M 8/04156* (2013.01); *H01M 8/04228* (2016.02); *H01M 8/04641* (2013.01); *H01M 8/04649* (2013.01); *H01M 8/04951* (2016.02); *H01M 8/04952* (2016.02); *H01M 8/04955* (2013.01); *H01M 2250/20* (2013.01)

(58) Field of Classification Search
CPC ......... H01M 8/04303; H01M 8/04126; H01M 8/04768; H01M 8/0494; H01M 8/04992; H01M 8/04305; H01M 8/2463; H01M 8/04156; H01M 8/04179; H01M 8/04228; H01M 8/04253; H01M 8/04641; H01M 8/04649; H01M 8/04951; H01M 8/04952; H01M 8/04955; H01M 2250/20; H01M 8/2465; B60L 58/30–34
See application file for complete search history.

(56) References Cited

U.S. PATENT DOCUMENTS

| | | | |
|---|---|---|---|
| 8,182,952 B2 | 5/2012 | Tanaka et al. | |
| 2005/0255346 A1* | 11/2005 | Ueda | H01M 8/04761 429/513 |

(Continued)

FOREIGN PATENT DOCUMENTS

| | | |
|---|---|---|
| JP | 2004-265684 A | 9/2004 |
| JP | 2007-048650 A | 2/2007 |

(Continued)

OTHER PUBLICATIONS

Office Action dated May 31, 2022 issued over the corresponding Japanese Patent Application No. 2020-193184 with the English translation thereof.

*Primary Examiner* — Matthew W Van Oudenaren
(74) *Attorney, Agent, or Firm* — Carrier Shende & Associates, P.C.; Fulchand P. Shende; Joseph P. Carrier

(57) ABSTRACT

When a time point of occurrence of a stop state of a fuel cell system is predicted during traveling, a drying state control that causes a fuel cell stack to transition to a dry state is started a predetermined time (a required drying time) before the predicted time point of occurrence of the stop state.

6 Claims, 4 Drawing Sheets

(51) Int. Cl.
  *H01M 8/04992* (2016.01)
  *H01M 8/04119* (2016.01)
  *B60L 58/33* (2019.01)
  *H01M 8/04746* (2016.01)
  *H01M 8/04537* (2016.01)
  *H01M 8/04955* (2016.01)
  *H01M 8/04228* (2016.01)

(56) References Cited

U.S. PATENT DOCUMENTS

2010/0239929 A1* 9/2010 Kajiwara .......... H01M 8/04365
                                                        429/442
2011/0003215 A1* 1/2011 Tanaka ................ H01M 8/0441
                                                        429/413

FOREIGN PATENT DOCUMENTS

| JP | 2007048650 | * | 2/2007 |
| JP | 2008-147139 A | | 6/2008 |
| JP | 2008-166018 A | | 7/2008 |
| WO | 2008/056617 A1 | | 5/2008 |

* cited by examiner

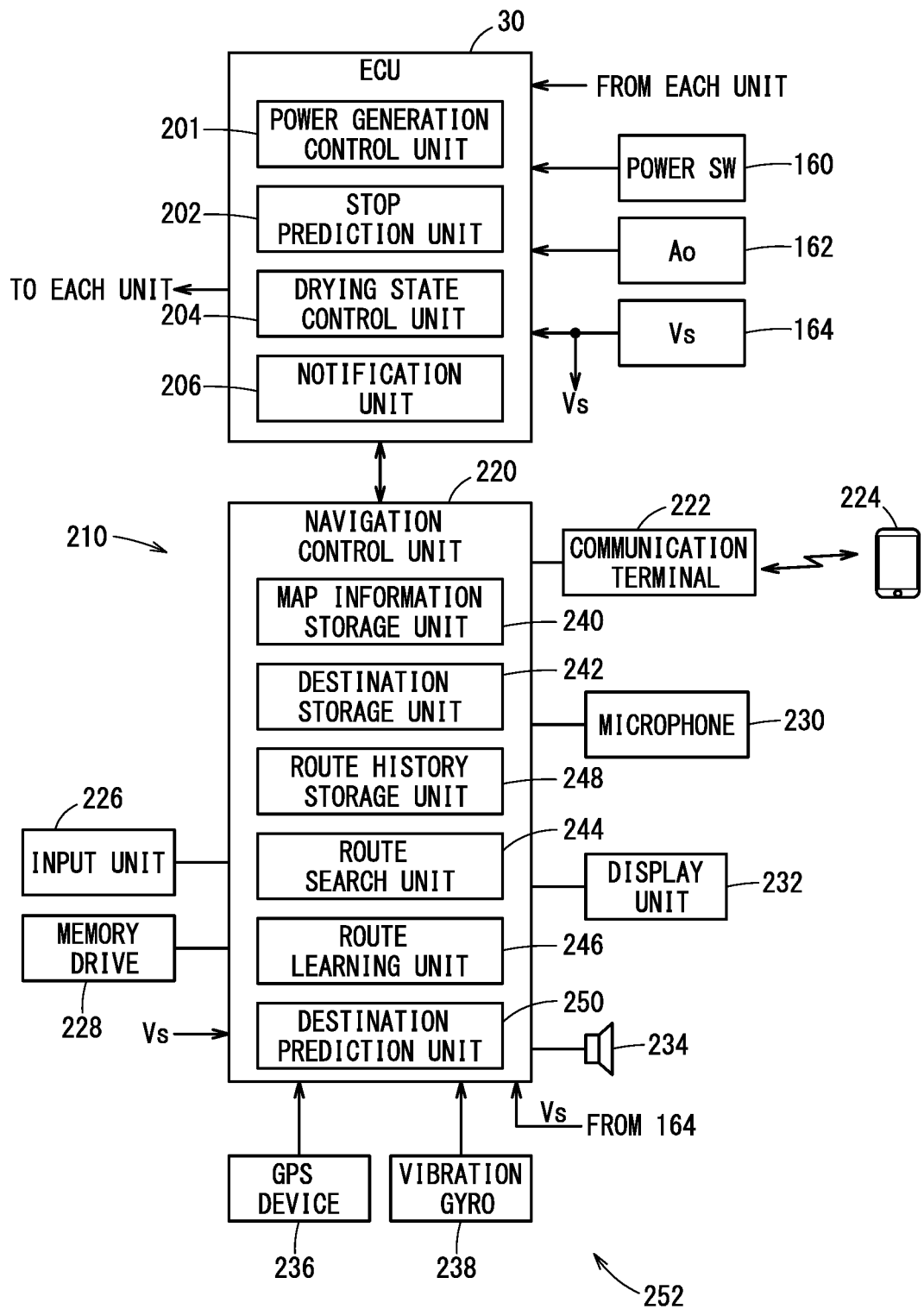

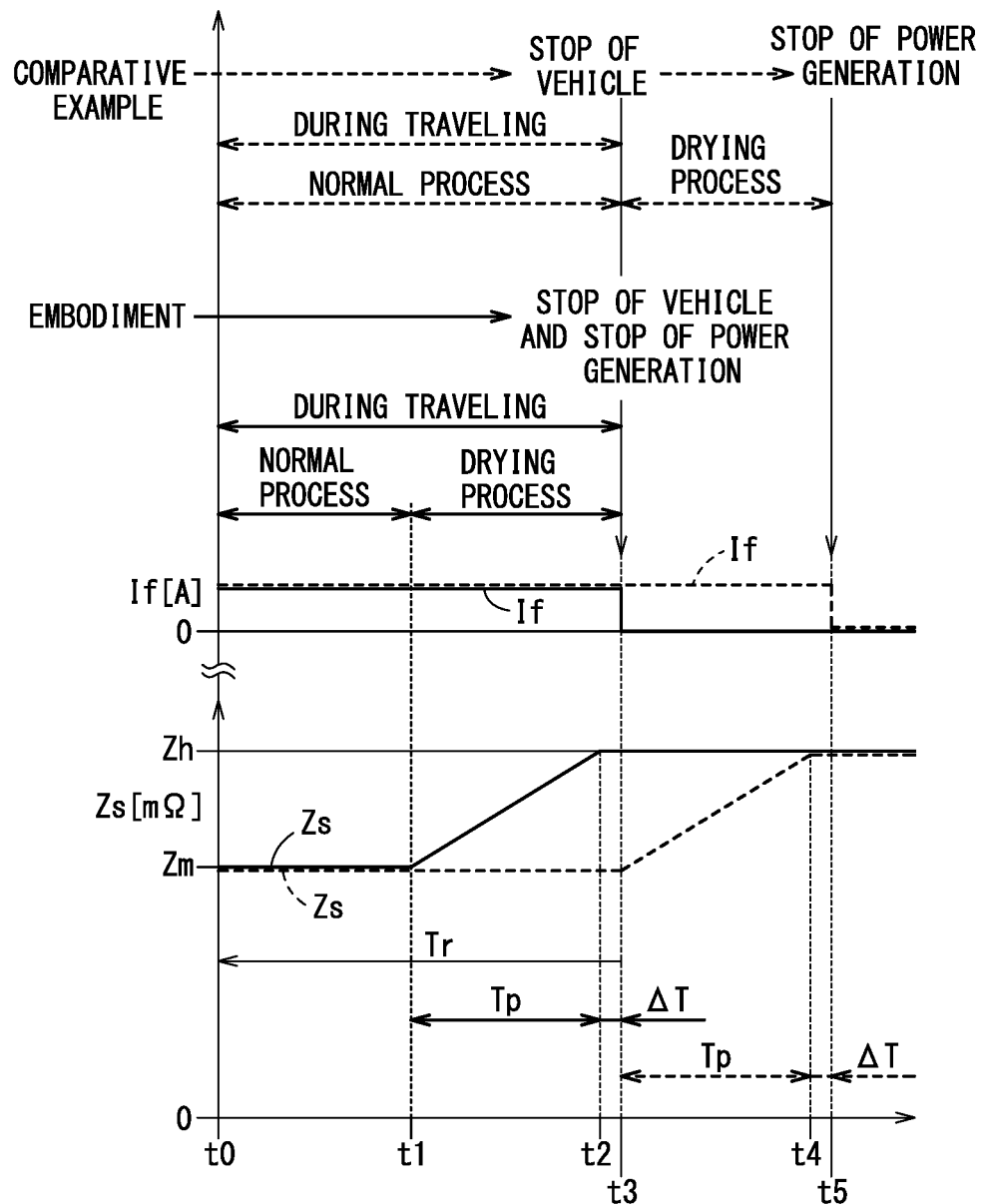

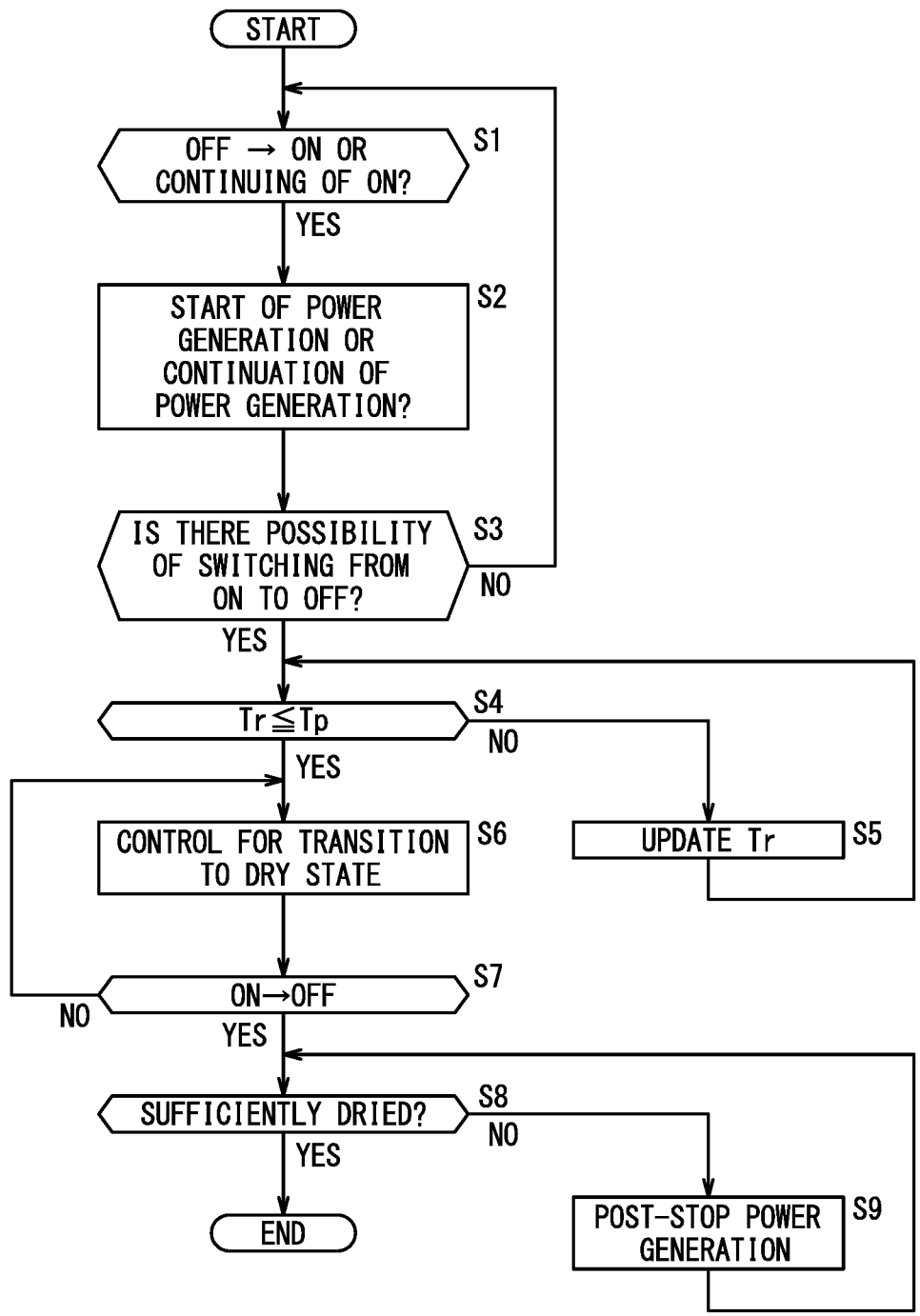

FUEL CELL VEHICLE AND METHOD OF STOPPING THE SAME

CROSS-REFERENCE TO RELATED APPLICATION

This application is based upon and claims the benefit of priority from Japanese Patent Application No. 2020-193184 filed on Nov. 20, 2020, the contents of which are incorporated herein by reference.

BACKGROUND OF THE INVENTION

Field of the Invention

The present invention relates to a fuel cell vehicle equipped with a fuel cell system including a fuel cell stack including a plurality of power generation cells stacked together, the power generation cells generating electric power by an electrochemical reaction of a fuel gas and an oxygen-containing gas, the fuel cell vehicle traveling by electric power generated by the fuel cell system, and a method of stopping the fuel cell vehicle.

Description of the Related Art

For example, a solid polymer electrolyte fuel cell includes a membrane electrode assembly (MEA) in which an anode is provided on one surface and a cathode is provided on the other surface of an electrolyte membrane, which is a polymer ion exchange membrane. The membrane electrode assembly is sandwiched between separators to form a power generation cell (unit cell). In general, a predetermined number of power generation cells are stacked together, to form a fuel cell stack. For example, the fuel cell stack is mounted, as an in-vehicle fuel cell stack, on a fuel cell vehicle (such as a fuel cell electric vehicle).

In the fuel cell vehicle, a motor is driven by electric power generated by the fuel cell stack, and wheels are rotated by the driven motor, thereby causing the vehicle to travel.

As is well known, in such a fuel cell vehicle, it is necessary to adjust the water content of the fuel cell stack at the time of stopping in order to improve the durability, power generation stability, and sub-freezing point startability of the fuel cell stack. That is, when the fuel cell stack is stopped, it is necessary to shift the moisture state in the fuel cell stack from the wet state at the time of power generation to the dry state.

JP 2004-265684 A discloses a fuel cell system in which a dried reactant gas (hydrogen or air) is supplied into fuel cell during stopping operation of the fuel cell, to thereby purge moisture from the fuel cell in a short time during the stopping ([0024], [0032], [0033], [0037] in JP 2004-265684 A).

SUMMARY OF THE INVENTION

As described above, in the technology disclosed in JP 2004-265684 A, when the operation of the fuel cell system is stopped, in order to shift the fuel cell stack to a dry state, it is necessary to perform a post-stop drying process in which power generation is continued for a certain period of time (which is referred to as a required drying time) after the vehicle has been stopped.

However, the post-stop drying process causes reduction in the marketability of the fuel cell vehicle that is driven by electric power generated by the fuel cell stack.

That is, in the conventional fuel cell vehicle requiring the post-stop drying process, even after the occupant switches the power switch from the ON state to the OFF state after the vehicle is stopped, the air pump for supplying the reactant gas required for the power generation in order for the fuel cell stack to transition to the dry state is operated for a certain period of time (a required drying time).

Therefore, as compared with a conventional engine vehicle or a hybrid vehicle in which the engine is immediately stopped when the operation is stopped (i.e., when the power switch is switched from the ON state to the OFF state), in the fuel cell vehicle, there is a problem in that the continuous operation sound of the air pump occurring during the required drying time after the operation is stopped gives uncomfortable feeling to the occupant.

The present invention has been made taking the above problem into account, and an object of the present invention is to provide a fuel cell vehicle and a method of stopping the fuel cell vehicle which can eliminate the need for post-stop drying process (post-stop power generation process) of the fuel cell vehicle or can significantly reduce the time required for post-stop drying process (post-stop power generation process).

According to an aspect of the present invention, there is provided a method of stopping a fuel cell vehicle equipped with a fuel cell system including a fuel cell stack, the fuel cell stack including a plurality of power generation cells stacked together, the power generation cells generating electric power by an electrochemical reaction of a fuel gas and an oxygen-containing gas, the fuel cell vehicle being configured to travel by electric power generated by the fuel cell system, the method including: predicting a time point of occurrence of a stop state of the fuel cell system during traveling; and starting a drying state control that causes the fuel cell stack to transition to a dry state, a predetermined time before the predicted time point of occurrence of the stop state.

According to another aspect of the present invention, there is provided a fuel cell vehicle equipped with a fuel cell system including a fuel cell stack, the fuel cell stack including a plurality of power generation cells stacked together, the power generation cells generating electric power by an electrochemical reaction of a fuel gas and an oxygen-containing gas, the fuel cell vehicle being configured to travel by electric power generated by the fuel cell system, the fuel cell vehicle including a stop prediction unit configured to predict a time point of occurrence of a stop state of the fuel cell system during traveling; and a drying state control unit configured to start a drying state control that causes the fuel cell stack to transition to a dry state, a predetermined time before the predicted time point of occurrence of the stop state.

According to the present invention, if the time point of occurrence of a stop state of the fuel cell system is predicted during driving, control that causes the fuel cell stack to transition to a dry state is performed a predetermined time before the predicted time point of occurrence of the stop state. Thus, it is possible to eliminate the need for the post-stop drying process (post-stop power generation process) of the fuel cell vehicle, or to significantly reduce the time required for the post-stop drying process (post-stop power generation process).

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2 is a functional block diagram of an ECU that controls the fuel cell vehicle according to the embodiment and a navigation device connected to the ECU;

FIG. 3 is a time chart for explaining a comparison between the pre-stop drying process of the fuel cell vehicle according to the embodiment and the post-stop drying process of the fuel cell vehicle according to a comparative example; and FIG. 4 is a flowchart for explaining the operation of the fuel cell vehicle according to the embodiment and the steps of the method for stopping the fuel cell vehicle according to the embodiment.

DESCRIPTION OF THE PREFERRED EMBODIMENTS

Figure 1:
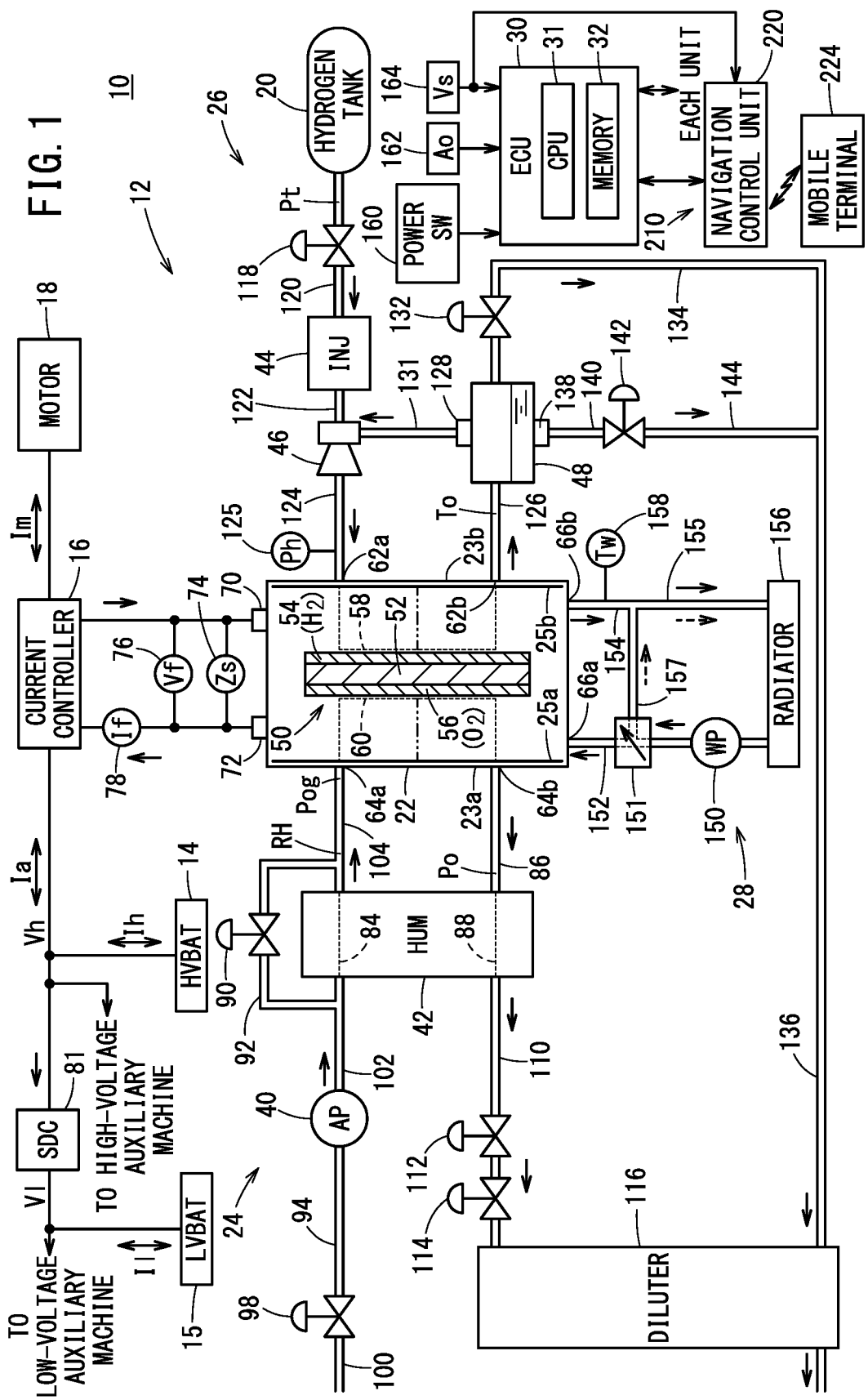
FIG. 1 is a schematic configuration explanatory diagram of a fuel cell vehicle according to an embodiment using a method for stopping a fuel cell vehicle according to an embodiment.

Hereinafter, embodiments of a fuel cell vehicle and a method for stopping the fuel cell vehicle according to the present invention will be described in detail with reference to the accompanying drawings.

[Configuration]

FIG. 1 is a schematic configuration explanatory diagram of a fuel cell vehicle (also simply referred to as a vehicle) 10 according to an embodiment using a method for stopping a fuel cell vehicle according to an embodiment.

FIG. 2 is a functional block diagram of an ECU (electronic control unit) 30 for controlling the fuel cell vehicle 10 and a navigation device 210 including a navigation control unit 220 connected to the ECU 30.

As shown in FIG. 1, the fuel cell vehicle 10 is, for example, a fuel cell electric vehicle. The fuel cell vehicle 10 basically includes a fuel cell system 12, a high-voltage power storage device (high-voltage battery: HVBAT) 14, a current controller 16, a motor (electric motor for driving the vehicle) 18, a high-pressure hydrogen tank 20, and the ECU 30. The high-voltage battery 14 includes a secondary battery, a capacitor, and the like.

By a processor (CPU, computer) 31 executing a program (or command) stored in a memory (storage device) 32, the ECU 30 functions as various functional units (functional means), for example, as shown in FIG. 2, such as a stop prediction unit 202, a drying state control unit 204, and a notification unit 206, which will be described in detail later, in addition to a conventional power generation control unit 201.

In FIGS. 1 and 2, the ECU 30 takes in data from the navigation control unit 220 and data from each unit (each component) of the fuel cell vehicle 10, and controls the fuel cell system 12 and each unit of the fuel cell vehicle 10, including control of the current controller 16, thereby controlling the entire fuel cell vehicle 10.

The navigation device 210 is wirelessly connected to a mobile terminal 224 such as a smartphone brought into the vehicle 10 by an occupant.

As shown in FIG. 1, the fuel cell system 12 includes a fuel cell stack (fuel cell) 22, an oxygen-containing gas system 24, a fuel gas system 26, and a coolant supply system 28.

The oxygen-containing gas system 24 supplies oxygen-containing gas to the fuel cell stack 22, and the fuel gas system 26 supplies fuel gas to the fuel cell stack 22. The coolant supply system 28 supplies a coolant (refrigerant) to the fuel cell stack 22.

The oxygen-containing gas system 24 includes an air pump (AP) 40 and a humidifier (HUM) 42. The fuel gas system 26 includes an injector (INJ) 44, an ejector 46, and a gas-liquid separator 48.

In the fuel cell stack 22, a plurality of power generation cells 50 are stacked between end plates 23a, 23b. Each power generation cell 50 is formed by sandwiching a membrane electrode assembly (MEA) between a pair of separators (not shown), the MEA including a solid polymer electrolyte membrane 52, and an anode 54 and a cathode 56 which sandwich the solid polymer electrolyte membrane 52. The solid polymer electrolyte membrane is a thin film of perfluorosulfonic acid containing water. As the solid polymer electrolyte membrane 52, an HC (hydrocarbon) based electrolyte is used, in addition to a fluorine-based electrolyte.

An anode flow field 58 through which hydrogen (fuel gas) flows is formed in the separator facing the anode 54, and a cathode flow field 60 through which air (oxygen-containing gas) flows is formed in the separator facing the cathode 56.

The fuel cell stack 22 is provided with a fuel gas inlet passage 62a and a fuel gas outlet passage 62b for supplying a fuel gas (for example, hydrogen gas) to the anode 54 through the anode flow field 58.

The fuel cell stack 22 is also provided with an oxygen-containing gas inlet passage 64a and an oxygen-containing gas outlet passage 64b through for supplying oxygen-containing gas (e.g., air) to the cathode 56 through the cathode flow field 60.

The fuel cell stack 22 is further provided with a coolant inlet passage 66a and a coolant outlet passage 66b through which coolant flows to each power generation cell 50.

In the fuel cell stack 22, plate-shaped electric heaters 25a, 25b for warming the inside of the fuel cell stack 22 when necessary are provided inside the end plates 23a and 23b.

In the anode 54 of the fuel cell stack 22, by the fuel gas being supplied, hydrogen ions are generated from hydrogen molecules by an electrode reaction caused by catalyst, and the hydrogen ions pass through the solid polymer electrolyte membrane 52 and then move to the cathode 56.

On the other hand, electrons released from the hydrogen molecules flow from negative electrode terminal 70 through the current controller 16 to loads such as the high-voltage battery 14, the motor 18, the air pump 40, and the ECU 30, and move to the cathode 56 via the current controller 16 and positive electrode terminal 72.

In the fuel cell vehicle 10, the load is made up of a motor 18 as a main machine load, an air pump 40 as an auxiliary machine load, and the like.

The power generation current If flowing out from the fuel cell stack 22 is supplied from the positive electrode terminal 72 to the load through the current controller 16 in a direction opposite to the flow of the electrons, and flows into the negative electrode terminal 70 from the load through the current controller 16. The power generation current If is detected by a current sensor 78.

In the cathode 56 of the fuel cell stack 22, hydrogen ions and electrons react with oxygen contained in the supplied oxygen-containing gas by the action of the catalyst, to thereby generate water.

A voltage sensor 76 for detecting the power generation voltage Vf of the fuel cell stack 22 and an impedance sensor 74 for detecting the impedance Zs of the fuel cell stack 22 are provided in parallel between the positive electrode terminal 72 and the negative electrode terminal 70.

The impedance Zs correlates with the system relative humidity (internal relative humidity) of the fuel cell stack 22. The system relative humidity depends on the degree of wetting of the solid polymer electrolyte membrane 52. The impedance Zs decreases as the degree of wetting increases, and the impedance Zs increases as the degree of wetting decreases (i.e., as the solid polymer electrolyte membrane transitions to a dry state).

A motor current (main machine current, which is a power running current or a regenerative current) Im flows between the current controller 16 and the motor 18.

An auxiliary machine current Ia flows between the current controller 16 and the auxiliary machine. A part of the auxiliary machine current Ia is input/output as a high-voltage battery current Ih to/from the high-voltage battery (HVBAT) 14 that generates a high voltage Vh of about several hundred [V], and is supplied to a high-voltage auxiliary machine such as the air pump 40.

The remaining part of the auxiliary machine current Ia is converted into a low voltage Vl of about 10 to 50 [V] via a voltage convertor 81 that is a step-down converter (SDC), and is input and output, as a low-voltage battery current Il, to and from the low-voltage battery 15 that generates the low voltage Vl, and is supplied to a low-voltage auxiliary machine such as the ECU 30, the electric heater 25a, 25b, etc.

The auxiliary machine current Ia is supplied, as a part of the motor current Im, from the high-voltage battery 14 to the motor 18 through the current controller 16.

In the fuel cell vehicle 10 configured as described above, electric power (generated electric power) of the fuel cell stack 22 and electric power (stored electric power) of the high-voltage battery 14 supply electric power to the motor 18, which serves as the main machine, the air pump 40, the ECU 30, which serve as the auxiliary machine, and the like.

In the oxygen-containing gas system 24, the air pump 40 includes a mechanical supercharger driven by an internal motor. The air pump 40 inhales atmospheric air (air), pressurizes the air, and supplies the pressurized air to the humidifier 42.

The humidifier 42 includes a flow path 84 through which an oxygen-containing gas, which is dry air supplied from the air pump 40, flows; a flow path 88 through which a wet exhaust gas (oxidant exhaust gas, cathode off-gas) flows; and a porous membrane in which the flow paths 84 and 88 are formed.

The humidifier 42 moves water contained in the cathode off-gas discharged from the oxygen-containing gas outlet passage 64b of the fuel cell stack 22, to the supply gas (oxygen-containing gas) that flows from the flow path 88 in the humidifier 42 to the flow path 84 through the porous membrane.

The degree of humidification at this time is set to a humidification amount (relative humidity) at which the solid polymer electrolyte membrane 52 is humidified to thereby cause the fuel cell stack 22 (each power generation cell 50) to exhibit a favorable power generation performance.

A bypass channel 92, which is a conduit with a bypass valve 90, is provided between the two ends of the flow path 84 of the humidifier 42, in order to cause dry air from the air pump 40 to bypass the humidifier 42 and supply the dry air to the fuel cell stack 22.

The inlet side of the air pump 40 communicates with the atmosphere through a conduit 94, a shutoff valve 98 (optional), and a conduit 100.

A discharge port side of the air pump 40 communicates with one end side of the flow path 84 of the humidifier 42 through a conduit 102. The other end side of the flow path 84 communicates with one end side of a supply path 104 which is a conduit, and the other end side of the supply path 104 communicates with the cathode flow field 60 in the fuel cell stack 22 through the oxygen-containing gas inlet passage 64a.

On the discharge side of the flow path 88 of the humidifier 42, an outlet stop valve 112 is provided in a conduit 110, and a diluter 116 is connected to the downstream side of the outlet stop valve 112 through a back pressure control valve 114. The supply side of the flow path 88 communicates with the oxygen-containing gas outlet passage 64b through a conduit 86. The cathode off-gas is supplied from the cathode flow field 60 of the fuel cell stack 22 to the supply side of the flow path 88.

The hydrogen tank 20 of the fuel gas system 26 is provided with an electromagnetic shutoff valve 118, and is a container that compresses high-purity hydrogen at high pressure.

The fuel gas discharged from the hydrogen tank 20 passes through a conduit 120, the injector 44, a conduit 122, the ejector 46, and a conduit 124, and is supplied to the inlet of the anode flow field 58 of the fuel cell stack 22 via the fuel gas inlet passage 62a.

A fuel gas inlet pressure sensor 125 for detecting the fuel gas inlet pressure Ph is provided in the conduit 124. The injector 44 is driven in the manner of PWM (pulse width modulation) by the ECU 30 to control the fuel gas inlet pressure Ph.

In the coolant supply system 28, a coolant such as pure water, ethylene glycol, or oil is supplied from a coolant circulation path 152 to the coolant inlet passage 66a of the fuel cell stack 22 via a thermo valve 151 which is a three way valve for temperature adjustment, under the operation of a cooling pump (WP) 150 controlled by the ECU 30. The opening ratio of the thermo valve 151 (the ratio of the opening of the coolant circulation path 152 side to the opening of a bypass channel 157 side of the internal control valve of the thermo valve 151) is also controlled by the ECU 30. In the case of the opening ratio being 1, all the coolant discharged from the cooling pump 150 is supplied into the fuel cell stack 22 through the coolant circulation path 152 and the coolant inlet passage 66a. In the case of the opening ratio being 0, all the coolant discharged from the cooling pump 150 is circulated to the cooling pump 150 via the bypass channel 157, the coolant circulation path 155, and a radiator 156.

Basically, during the normal process (normal power generation), the coolant supplied to the coolant inlet passage 66a cools the power generation cells 50 in the fuel cell stack 22, and then is discharged from the coolant outlet passage 66b. The coolant discharged from the coolant outlet passage 66b is cooled by the radiator 156 through the coolant circulation paths 154 and 155, and is further circulated and supplied to the fuel cell stack 22 under the operation of the cooling pump 150.

At the time of starting the fuel cell vehicle 10, the thermo valve 151 controlled by the ECU 30 is switched such that all the coolant from the cooling pump 150 is supplied to the bypass channel 157 side as shown by a broken line arrow. At the time of the normal power generation, the thermo valve is switched such that all the coolant from the cooling pump 150 is supplied to the coolant circulation path 152 side as shown by a solid line arrow.

That is, at the time of start-up, the coolant circulates through the path formed by the cooling pump 150, the thermo valve 151, and the radiator 156 so as not to cool the fuel cell stack 22, for the purpose of warm-up of the fuel cell stack 22.

A temperature sensor 158 for detecting the temperature (coolant temperature) Tw of the coolant is disposed near the coolant outlet passage 66b of the coolant circulation path 154.

On the other hand, during the normal process (normal power generation), the internal temperature of the fuel cell stack 22 is controlled, for example, to be as high as possible (appropriate temperature) under the condition that the internal temperature is equal to or lower than the boiling point of water, in order to efficiently perform power generation (in order to promote the electrochemical reaction). For this temperature control, the power generation control unit 201 circulates the coolant through the cooling pump 150, the thermo valve 151, the coolant circulation path 152, the inside of the fuel cell stack 22, the coolant circulation paths 154 and 155, and the radiator 156, and controls the rotation speed of the cooling pump 150.

The outlet of the anode flow field 58 communicates with the inlet of the gas-liquid separator 48 through the fuel gas outlet passage 62b and a conduit 126, and the fuel exhaust gas (anode off-gas), which is a hydrogen-containing gas, is supplied from the anode flow field 58 to the gas-liquid separator 48.

The gas-liquid separator 48 separates the anode off-gas into a gas component and a liquid component (liquid water). Part of the gas component of the anode off-gas is discharged from a gas discharge port 128 of the gas-liquid separator 48 and directed to the ejector 46 through a conduit 131. The other part thereof is directed to the diluter 116 through a conduit 134 and a conduit 136 under the opening action of a purge valve 132.

Fuel gas is supplied to the ejector 46 from an injector 44 provided on the upstream side of the ejector 46 via the conduit 122. Therefore, the gas component of the anode off-gas are sucked by the ejector 46, mixed with the fuel gas, and supplied to the anode flow field 58 of the fuel cell stack 22 through the conduit 124 via the fuel gas inlet passage 62a.

The liquid component of the anode off-gas flows from a liquid discharge port 138 of the gas-liquid separator 48 through a conduit 140, a drain valve 142, and a conduit 144, and is then merged with the anode off-gas. The merged liquid component passes through the conduit 136 and the diluter 116, and is then discharged to the outside of the fuel cell vehicle 10.

The fuel cell vehicle 10 is provided with a power switch (power SW) 160, which is an ON/OFF switch. The power SW is operated for starting the fuel cell vehicle 10 and starting power generation by the fuel cell stack 22. The power SW is also operated for stopping power generation and bringing the fuel cell vehicle 10 into a soaking (key-off) state (a stoppage state).

Further, the fuel cell vehicle 10 is provided with an accelerator opening degree sensor 162 that detects an operation amount of an accelerator as an accelerator opening degree Ao. Further, the fuel cell vehicle 10 is provided with a vehicle speed sensor 164 that detects a vehicle speed Vs.

The on/off state of the power switch 160, the accelerator opening degree Ao detected by the accelerator opening degree sensor 162, and the vehicle speed Vs detected by the vehicle speed sensor 164 are supplied to the ECU 30.

Although not shown, the fuel cell vehicle 10 is provided with a current sensor for detecting a motor current Im, a current sensor for detecting an auxiliary machine current Ia, a current sensor for detecting a high-voltage battery current Ih, a current sensor for detecting a low-voltage battery current Il, and a voltage sensor for detecting a low-voltage battery voltage (low voltage) Vl.

The fuel cell system 12 also includes a humidity sensor for detecting the relative humidity RH of the oxygen-containing gas supplied to the oxygen-containing gas inlet passage 64a, a pressure sensor for detecting the oxygen-containing gas pressure Pog at the oxygen-containing gas inlet passage 64a, a temperature sensor for detecting the anode off-gas temperature To at the fuel gas outlet passage 62b, a pressure sensor for detecting the cathode off-gas pressure Po at the oxygen-containing gas outlet passage 64b, and a pressure sensor for detecting the tank pressure Pt at the outlet of the hydrogen tank 20. Detection values of these various sensors are supplied to the ECU 30.

As shown in FIG. 2, the navigation device 210 includes, in addition to the navigation control unit 220, a communication terminal 222 connected to the navigation control unit 220, a microphone (audio input device) 230, a display unit (image display device such as a monitor or a display) 232, a speaker (audio output device) 234, a memory drive 228 for accessing an external recording medium in which map/road information is stored, an input unit (a touch panel on the display unit 232) 226, and a current position detection device 252.

The current position detection device 252 is a device that detects the current position (current position) of the vehicle 10, and includes a vibration gyroscope (vibration gyro) 238 that detects the traveling direction of the vehicle 10, the vehicle speed sensor 164 that detects the vehicle speed Vs, a GPS device 236 that detects a positioning signal such as a GPS signal from a satellite positioning device such as a GPS satellite, and the like.

A mobile terminal 224 is connected to the communication terminal 222 according to a known near-field communication standard. The mobile terminal 224 is wirelessly connected to an external mobile terminal, a server, or the like through a base station (not shown).

The navigation control unit 220 is configured by a microcomputer that functions as various functional units (functional means) by a processor (CPU) (not shown) executing a program stored in a memory (not shown). In this embodiment, the navigation control unit 220 includes, as the functional units, a route search unit 244, a route learning unit 246, a destination prediction unit 250, and the like.

The memory includes, in addition to the program storage unit, a map information storage unit 240 storing map/road information including road information (including route plans) and POI information (facility information), a destination storage unit 242 storing a destination as information (destination information), a route history storage unit 248, and the like.

The route search unit 244 can search for a route from the current position of the vehicle 10 to the destination by reading the map information of the map information storage unit 240 based on the input of the destination information from the input unit 226 of the navigation device 210 by the occupant, set a route plan (recommended route), and present the route plan on the display unit 232.

The route learning unit 246 learns a route (a departure place, a destination, a combination of link nodes from the departure place to the destination, and a traveling date and time) from a departure place (a home, a company, a supermarket, or the like) to a destination (a company to be reached from a home, a home to be reached from a company, a supermarket to be reached from a home, a home to be reached from a supermarket, or the like) along which the vehicle 10 actually travels, regardless of whether or not destination information is input.

In the route history storage unit 248, the route of the route learning result is recorded as a route history. When the same route is traveled a plurality of times, the cumulative number of times the route is traveled is also recorded, together with the route, in the route history. The route history is updated in a first-in, first-out manner.

When the destination information is not set by the input unit 226, the destination prediction unit 250 predicts the destination based on the route history stored in the route history storage unit 248.

In this case, during driving, the destination prediction unit 250 sequentially compares the link nodes in the route from the departure point (the position where the power switch 160 is turned on) to the current position detected by the current position detection device 252 with the link nodes of the routes in the route history stored in the route history storage unit 248. The destination prediction unit specifies, as the current route, a route in the route history in which the order of appearance of the link nodes coincides with the order thereof in the currently-traveled route a predetermined number of times, and predicts the destination of the specified route as the destination of the currently-traveled route.

When the navigation device 210 executes route guidance along the route plan, the destination of the route plan is recorded as destination information in the destination storage unit 242, and when the route guidance is not executed, the predicted destination is recorded as destination information in the destination storage unit 242.

The stop prediction unit 202 acquires the current position (current position) of the vehicle 10 detected by the current position detection device 252 in real time through the navigation control unit 220, and calculates the remaining travel time (remaining time) Tr from the current position of the traveling vehicle 10 to the destination (i.e., the stop position (parking position)), based on the remaining distance, the average vehicle speed, the legal speed of the road, and the like.

When the route guidance is not executed, the stop prediction unit 202 predicts whether or not the route on which the vehicle 10 is currently traveling coincides with a specific route in the route history stored in the route history storage unit 248. When it is predicted that the currently-traveled route is coincident with the specific route in the route history, it can be predicted that a stop condition of the vehicle 10 will occur at a point in time when the remaining travel time Tr is predicted to be zero (Tr=0) due to the arrival of the vehicle 10 at the destination (which is recorded in the destination storage unit 242) of the route in the coincident route history.

As a matter of course, when the navigation device 210 is executing the route guidance, the stop prediction unit 202 can predict the occurrence of a stop condition of the vehicle 10 (i.e., arrival of the destination: the remaining travel time Tr=0), based on the destination information in the route plan set in the destination storage unit 242.

Further, when a so-called mobile order is placed from the mobile terminal 224 to a specific store or restaurant by an occupant, the navigation control unit 220 acquires the position information of the store or restaurant by referring to the map information storage unit 240. In this case, the route search unit 244 automatically sets the destination of the vehicle 10 to the position of the store or the restaurant, records the destination as destination information in the destination storage unit 242, performs route search, and generates a route plan from the current location to the destination. This route plan can also be displayed on the display unit 232 of the navigation device 210.

The stop state of the vehicle 10 is fixed (determined) by the transition of the power switch 160 from the ON state to the OFF state (occurrence of the stop state of the vehicle 10) after the vehicle speed Vs becomes zero (Vs=0).

When the stop prediction unit 202 predicts that the stop state of the vehicle 10 will occur and the remaining travel time Tr has become shorter than the required drying time Tp, the notification unit 206 of the ECU 30 notifies the occupant that the drying state control process is to be performed, on the display unit 232 or by the speaker 234, before the drying state control unit 204 starts the drying control.

For example, the following notification is given: "You will soon arrive at your destination XXX (the place name, the store or restaurant name, home, etc.). We will implement a process (drying control) for shortening the power generation time of the fuel cell after the power is switched off upon arrival."

Here, the "power generation time" means a power generation time (required drying time Tp) required for causing the moisture state in the fuel cell stack 22 to transition from a desired wet state at the time of power generation to a desired dry state at the time of stoppage of the fuel cell system, after the fuel cell vehicle 10 has been stopped (parked), in other words, after the power switch 160 of the fuel cell vehicle 10 has been shifted from the on state to the off state.

The desired dry state is determined by the drying state control unit 204 based on the value of the impedance Zs of the fuel cell stack 22 detected by the impedance sensor 74.

After the notification by the notification unit 206, during traveling of the vehicle 10, the drying state control unit 204 performs (starts) the pre-stop drying process (in-travel drying process), according to the main part of the present invention, for causing the fuel cell stack 22 to transition to a dry state, a predetermined time (required drying time Tp) before a time point (i.e., a point in time) (vehicle-stop time point) t3 at which the stop state occurs.

[Operation]

Basically, the fuel cell vehicle 10 according to the embodiment is configured as described above. For the convenience of understanding, the operation of the fuel cell vehicle 10 and the processing contents of the stopping method of the fuel cell vehicle according to the embodiment will first be briefly explained with reference to the time chart shown in FIG. 3, and then explained with reference to the flow chart shown in FIG. 4.

[Description of Operation of Pre-Stop Drying Process with Reference to Time Chart]

FIG. 3 is a time chart for explaining a comparison between the pre-stop drying process of the fuel cell vehicle 10 according to an embodiment of the present invention and the post-stop drying process of the fuel cell vehicle according to a comparative example.

Comparative Example

First, in the post-stop drying process of the fuel cell vehicle according to the comparative example, the normal process (normal control) during traveling is performed until the time point t3 at which the power switch 160 transitions from the ON state to the OFF state. In the normal process, power generation control is performed in a state that the relatively low impedance Zm corresponding to the desired wet state (degree of wetting) in the fuel cell stack 22 is set as the target impedance.

The power generation is switched from the normal process (normal control) to the drying process (drying control, post-stop power generation process) after the time point t3 at which the vehicle is stopped. In this case, the relatively high impedance Zh (Zh>Zm) corresponding to the desired dry state (degree of dryness) in the fuel cell stack 22 is set as the target impedance, and the power generation control is continued.

At the time point t5 at which a short margin time ΔT has elapsed from the time point t4 at which the impedance Zs detected by the impedance sensor 74 has reached the target impedance Zh, the air pump 40 is stopped, the shutoff valves 98 and 118 are closed, and the supply of the reactant gas is stopped, so that the fuel cell vehicle 10 reaches the soak state (stoppage state).

In this manner, the power generation current If of the fuel cell stack 22 continuously flows from the time point t0 during traveling, through the time point t3 at which the vehicle is stopped, to the time point t5 at which power generation is stopped.

Embodiment

On the other hand, in the pre-stop drying process of the fuel cell vehicle 10 according to the embodiment, while the vehicle is traveling in the normal process (wet state: Zs=Zm), the stop prediction unit 202 calculates the remaining travel time Tr and the stopping time (stop prediction time) t3 to the destination, based on the destination information of the currently-traveled route (destination information stored in the destination storage unit 242 based on the route plan) or the destination information predicted by the destination prediction unit 250 and recorded in the destination storage unit 242.

The stop prediction unit 202 or the drying state control unit 204 calculates a time point t1 going back from a stop time point (stop prediction time point) t3 by a time required for the drying process (i.e., required drying time Tp+minute margin time ΔT), at a first calculation time point t0 of a remaining travel time Tr decreasing every moment during traveling.

During traveling of the vehicle 10, the drying state control unit 204 starts to perform the drying process such that the inside of the fuel cell stack 22 has a relatively high impedance Zh (Zh>Zm) corresponding to a desired dry state (degree of dryness), at a time point t1 when Tr (remaining travel time)=Tp+ΔT≈Tp (required drying time).

At the time point t3 at which a short margin time Δt has elapsed from the time point t2 at which the impedance Zs has reached the target impedance Zh, the power generation control unit 201 stops the air pump 40 and closes the shutoff valves 98 and 118, thereby stopping the supply of the reactant gas and bringing the fuel cell vehicle 10 into the soak state (stoppage state).

By performing the process in the above manner, it is possible to eliminate the post-stop drying process (post-stop power generation process) after the time point t3, which has been described in the comparative example.

If drying is not completed (i.e., the impedance does not reach the target impedance Zh) at the time point t3, then the post-stop power generation process is performed for a time required for making up for the shortfall (for a very short time compared to the required drying time Tp). Thus, the time required for the post-stop drying process (post-stop power generation process) can be significantly reduced.

As described above, in the fuel cell vehicle 10 according to the embodiment, since the post-stop power generation process time can be set to zero or a very short time, it is possible to prevent or suppress the occurrence of noise and discomfort due to the operation of the air pump 40 during soaking (stopping), and it is possible to improve the marketability of the fuel cell vehicle 10. Incidentally, the required drying time Tp is about several minutes.

[Description of Pre-Stop Drying Process with Reference to Flowchart]

The processing (control program) according to the flowchart of FIG. 4 is executed by (the CPU of) the ECU 30 unless otherwise specified. However, it would be cumbersome to refer to the above each time, and therefore such reference is made as necessary.

In step S1, the ECU 30 detects whether or not the power switch 160 of the fuel cell vehicle 10 has transitioned from the off state to the on state. Alternatively, it is detected whether or not the ON state continues.

When the transition to the ON state is detected (step S1: YES), the fuel cell vehicle 10 starts running by the power generation operation (start of power generation) of the fuel cell vehicle 10 and the accelerator pedal operation of the occupant at step S2.

In this case, the shutoff valve 118 of the hydrogen tank 20 is opened by the power generation control unit 201, and the fuel gas is supplied from the hydrogen tank 20 to the anode flow field 58 in the fuel cell stack 22 through the conduit 120, the injector 44, the conduit 122, the ejector 46, the conduit 124, and the fuel gas inlet passage 62a.

At the same time, the air pump 40 is driven by the power generation control unit 201, so that the oxygen-containing gas sucked from the atmosphere by the air pump 40 is supplied to the cathode flow field 60 in the fuel cell stack 22 through the conduit 100, the opened shutoff valve 98, the conduit 94, the air pump 40, the flow path 84 of the humidifier 42, the supply path 104, and the oxygen-containing gas inlet passage 64a.

As a result, the fuel gas and the oxygen-containing gas (both reactant gases) are consumed by the electrochemical reaction at the anode catalyst of the anode 54 and the cathode catalyst of the cathode 56, whereby power is generated (power generation control).

The motor 18 is then driven under the control of a travel control unit (not shown) in the ECU 30, so that the fuel cell vehicle 10 travels. Specifically, the motor 18 is driven through the current controller 16 by the electric power generated by the fuel cell stack 22 and/or the electric power stored in the high-voltage battery 14 according to the accelerator opening degree Ao from the accelerator opening degree sensor 162 by the accelerator operation, whereby the fuel cell vehicle 10 travels in a manner according to the accelerator opening degree Ao (travel control).

In this case, the surplus generated power of the fuel cell stack 22 and the regenerative power of the motor 18 during downhill traveling or the like are stored in the high-voltage battery 14 through the current controller 16 (power storage control).

When the continuation state of the ON state is detected in step S1 (step S1: YES), the power generation control, the travel control, and the power storage control are similarly executed.

During these controls, the oxygen-containing gas supplied to the cathode 56 and partially consumed (i.e., the cathode off-gas containing the reaction product water (moisture) generated in the fuel cell stack 22 and discharged from the oxygen-containing gas outlet passage 64b) flows through the conduit 86, passes through the flow path 88 of the humidifier 42, and humidifies the oxygen-containing gas to be supplied from the air pump 40 to the fuel cell stack 22 through the flow path 84 of the humidifier 42.

Further, the cathode off-gas passing through the flow path 88 of the humidifier 42 is discharged to the outside through the diluter 116 via the conduit 110, the opened outlet stop valve 112, and the back pressure control valve 114.

On the other hand, an unconsumed portion of the fuel gas that has not been consumed in the anode 54 is discharged, as anode off-gas of the fuel cell stack 22, from the fuel gas outlet passage 62b to the conduit 126, and then introduced into the gas-liquid separator 48.

The gas-liquid separator 48 separates the anode off-gas into an exhaust gas which is a gas component and an exhaust fluid which is a liquid component (liquid water). At this time, when the drain valve 142 is in the closed state, the discharge fluid accumulates on the upstream side of the drain valve 142.

In this case, the fuel gas is jetted out from the injector 44 to the upstream side of the ejector 46, whereby a negative pressure is generated in the conduit 131. Therefore, the exhaust gas separated by the gas-liquid separator 48 is sucked into the ejector 46 via the conduit 131 and is mixed with the fuel gas supplied to the conduit 122. As a result, the mixed gas is discharged to the conduit 124 that is on the downstream side of the ejector 46.

That is, unconsumed part of the fuel gas that has been discharged, as the anode off-gas, from the anode 54 without being consumed in the power generation reaction, is subjected to gas-liquid separation (i.e., water is removed), and circulates as an exhaust gas. Thereafter, the exhaust gas is mixed with the fuel gas newly supplied to the conduit 122, and then supplied, as the mixed gas, to the anode 54 again.

When a predetermined amount or more of fluid is stored in the gas-liquid separator 48 during the continuation of power generation, the drain valve 142 is opened so as to keep a predetermined liquid level.

Further, at the start of power generation (in step S2 after it has been detected that OFF has transitioned to ON at step S1) or during the continuation of power generation (in step S2 after it has been detected that power generation continues in step S1), the coolant supply system 28 controls the opening ratio of the thermo valve 151 and the rotation speed of the cooling pump 150 such that the coolant temperature Tw detected by the temperature sensors 158 becomes the above-described appropriate temperature.

At the start of power generation, the opening ratio of the thermo valve 151 is set to "0", so that no coolant is supplied to the coolant circulation path 152. In addition, the rotational speed of the cooling pump 150 is set to the minimum rotational speed, and the electric heaters 25a and 25b are energized to warm up the fuel cell stack 22.

Next, in step S3, during traveling in which the power generation control, the traveling control, or the power storage control of the vehicle 10 is performed, the stop prediction unit 202 in the ECU 30 determines whether or not there is a switching possibility that the power switch 160 will be switched from the on state to the off state (i.e., a possibility of switching the power switch from an ON state to an OFF state).

In other words, during traveling, the stop prediction unit 202 determines whether or not a stop state (parked state) of the vehicle 10 will occur, i.e., whether or not a state in which the power switch 160 is switched from the ON state to the OFF state after the remaining travel time Tr of the vehicle 10 becomes 0 (Tr=0) will occur. The determination on whether the stop state will occur is executed by the stop prediction unit 202.

In this case, first, when the destination storage unit 242 of the navigation device 210 has, stored therein, the destination information set at the time of searching for the route plan in relation to the currently traveled route of the vehicle 10, the stop prediction unit 202 predicts whether or not the stop state of the vehicle 10 will occur based on the destination information.

In this case, with reference to the vehicle speed Vs, the legal speed limit, and the like, it is possible to predict that the stop state of the vehicle 10 will occur at a time point (predicted stop time point) t3 at which the remaining travel time Tr from the current location to the destination elapses.

Secondly, when the destination storage unit 242 of the navigation device 210 does not store the destination information set at the time of searching for the route plan in relation to the currently traveled route of the vehicle 10, the stop prediction unit 202 calculates the remaining travel time Tr from the current location to the destination based on the destination information predicted by the destination prediction unit 250.

In this case, the destination prediction unit 250 sequentially compares the route history learned by the route learning unit 246 and recorded in the route history storage unit 248 with the currently-traveled route to thereby identify a route history having a high degree of similarity, and deems the destination information of the identified route history to be the destination of the currently-traveled route (referred to as a deemed destination). The stop prediction unit 202 calculates the remaining travel time Tr from the current location to the deemed destination.

When the remaining travel time Tr is calculated, it is determined that there is a switching possibility (possibility of switching) that the power switch 160 will be switched from the ON state to the OFF state when the remaining travel time Tr has elapsed, (step S3: YES).

In a state where it is not determined that such a possibility of switching is present, it is determined that there is no possibility of switching (step S3: NO), and the process returns to the ON-continuation process of step S1.

When it is determined that the possibility of switching is present, the stop prediction unit 202 determines whether or not the remaining travel time Tr has become equal to or less than the required drying time Tp (Tr≤Tp) in step S4.

In the case of Tr (remaining travel time)>Tp (required drying time) (step S4: NO), the stop prediction unit 202 updates the remaining travel time Tr based on the current position detected by the current position detection device 252 and the vehicle speed Vs detected by the vehicle speed sensor 164 in step S5.

When the determination of Tr (remaining travel time)≤Tp (required drying time) is established in step S4 (step S4: YES), in step S6, the notification unit 206 notifies the occupant of the execution of the drying state control process (see the above) on the display unit 232 and using the speaker 234 (time point t1), and the control process (drying process) for causing the inside of the fuel cell stack to transition to the dry state is performed by the drying state control unit 204.

The drying process performed by the drying state control unit 204 is a process for causing the wet state (which corresponds to an impedance Zm in this embodiment) in the fuel cell stack 22 to transition to a desired dry state (i.e., an impedance Zh, Zh>Zm).

Here, the drying process may be performed by at least one or a combination of the following controls (a) to (d).

(a) The opening ratio of the thermo valve 151 is set to "0" and control is provided in order for the coolant not to circulate in the fuel cell stack 22. That is, the circulation of the coolant in the fuel cell stack 22 is stopped to thereby prevent the inside of the fuel cell stack 22 from being cooled and to thereby increase the internal temperature, whereby the solid polymer electrolyte membrane 52 is caused to transition from a wet state to a predetermined dry state (Zs=Zh).

(b) By reducing the rotation speed of the cooling pump 150 for circulating the coolant, to a value less than the rotation speed in the normal process, the flow rate of the coolant supplied into the fuel cell stack 22 is reduced, cooling of the inside of the fuel cell stack 22 is suppressed, and the internal temperature is raised. As a result, in particular, the solid polymer electrolyte membrane 52 is caused to transition from the wet state (Zs=Zm) to the predetermined dry state (Zs=Zh).

(c) By opening the bypass valve 90 provided in the bypass channel 92 that bypasses the humidification flow path 84 of the humidifier 42 including the humidification flow path 84 that humidifies the oxygen-containing gas supplied to the fuel cell stack 22, the dry air compressed by the air pump 40 and having an increased temperature is supplied to the inside of the fuel cell stack 22 through the bypass channel 92 and the oxygen-containing gas inlet passage 64a. As a result, the internal temperature of the fuel cell stack 22 is increased, and in particular, the solid polymer electrolyte membrane 52 is directly caused to transition from a wet state (impedance Zs=Zm) to a predetermined dry state (Zs=Zh).

(d) By increasing the internal temperature of the fuel cell stack 22 by energizing the electric heaters 25a and 25b provided to warm up the fuel cell stack 22, the solid polymer electrolyte membrane 52 is caused to transition from the wet state (Zs=Zm) to a predetermined dry state (Zs=Zh).

The drying process by the drying state control unit 204 in step S6 is continued until, in step S7, the power switch 160 is switched from the ON state to the OFF state (step S7: YES) (S6→S7: NO→S6).

When the power switch 160 is switched from the ON state to the OFF state (step S7: YES), the drying state control unit 204 determines whether or not the inside of the fuel cell stack 22 is sufficiently dried in step S8.

When the impedance Zs is equal to Zh (Zs=Zh), it is determined that the drying is sufficient (step S8: YES), and the drying process is ended, for example, at time point t3.

On the other hand, if the impedance Zs is still less than Zh (Zs<Zh) and the drying is not sufficient (step S8: NO), the drying state control unit 204 performs, at step S9, the post-stop power generation process (i.e., further continuing the dry process that continues from the time point t1) from time point t3, until the impedance Zs becomes Zh (Zs=Zh) (step S8: YES).

[Invention that can be Understood from Embodiments]

Next, the invention understood from the above embodiment will be described below. It should be noted that, for ease of understanding, constituent elements are labelled with the reference numerals of those used in the embodiment, but the present invention is not limited to such constituent elements labelled with the reference numerals.

According to the present invention, there is provided a method of stopping a fuel cell vehicle 10 equipped with a fuel cell system 12 including a fuel cell stack 22, the fuel cell stack including a plurality of power generation cells 50 stacked together, the power generation cells 50 generating electric power by an electrochemical reaction of a fuel gas and an oxygen-containing gas, the fuel cell vehicle 10 being configured to travel by electric power generated by the fuel cell system 12. The method includes: a stop prediction step S3 of predicting a time point t3 of occurrence of a stop state of the fuel cell system 12 during traveling; and a drying state control step S6 of starting (performing) a drying state control that causes the fuel cell stack 22 to transition to a dry state, a predetermined time (a required drying time) Tp before the predicted time point t3 of occurrence of the stop state.

According to the present invention, if the time point t3 of occurrence of a stop state of the fuel cell system 12 is predicted during driving, control for causing the fuel cell stack 22 to transition to a dry state is started a predetermined time (required drying time) Tp before the predicted time point t3 of occurrence of the stop state. Thus, it is possible to eliminate the need for the post-stop drying process (post-stop power generation process) of the fuel cell vehicle 10, or alternately to significantly reduce the time required for the post-stop drying process (post-stop power generation process).

In the method of stopping the fuel cell vehicle 10, the stop prediction step S3 may include predicting the time point t3 of occurrence of the stop state of the fuel cell system 12, based on a route learning result by a navigation device 210.

Thus, even when the route plan is not set by the navigation device 210, the control for causing the fuel cell stack to transition to a dry state can be performed before stoppage of the fuel cell system 12 (vehicle 10).

Further, in the method of stopping the fuel cell vehicle 10, the stop prediction step S3 may include predicting the time point t3 of occurrence of the stop state of the fuel cell system 12, based on destination information of a navigation device 210. Accordingly, compared to a case where the route plan is not set by the navigation device 210, it is possible to more reliably perform the control for transition to a dry state before the stop of the fuel cell system 12 (vehicle 10).

Furthermore, the stop method of the fuel cell vehicle 10 may further include a notification step of, if the time point t3 of occurrence of the stop state is predicted in the stop prediction step S3, notifying an occupant that the drying state control is to be performed, before start of the drying state control step S6. This makes it possible to give the occupant of the vehicle 10 a friendly feeling.

Further, in the method of stopping the fuel cell vehicle 10, the drying state control step S6 may include performing at least one of: a coolant circulation stop process of stopping circulation of coolant circulated and supplied to the fuel cell stack 22; a pump rotation speed reduction process of reducing a rotation speed of a cooling pump 150 that circulates the coolant, to a value less than a normal rotation speed; a bypass channel opening process of supplying, to the fuel cell stack 22, one reactant gas of the oxygen-containing gas and the fuel gas which are to be supplied to the fuel cell stack 22, by bypassing a humidification flow path 84 that humidifies the reactant gas; and a heater energization process of energizing electric heaters 25a, 25b that warm up the fuel cell stack 22. Thus, the inside of the fuel cell stack 22 can be brought into a dry state.

Furthermore, in the method of stopping the fuel cell vehicle 10, the dry state of the fuel cell stack 22 is determined based on impedance Zs of the fuel cell stack 22. This makes it possible to keep the inside of the fuel cell stack 22 in a desired constant dry state.

Furthermore, in the method of stopping the fuel cell vehicle 10, the stop prediction step S3 may include predicting whether the stop state will occur or not by determining whether or not there is a possibility of switching a power switch 160 from an ON state to an OFF state. Since the power generation of the fuel cell stack 22 is stopped by the transition of the power switch 160 to the OFF state, the system stop of the fuel cell system 12 can be reliably predicted.

Furthermore, the method of stopping the fuel cell vehicle 10 may further include a post-stop power generation step S9 of causing the fuel cell stack 22 to generate electric power until the dry state reaches a predetermined dry state, if the power switch 160 is switched from the ON state to the OFF state. As a result, even when the control for transition to the dry state does not reach a sufficient level by the time when the vehicle stops, it is possible to reliably cause the fuel cell stack to transition to a desired dry state.

According to the present invention, there is provided a fuel cell vehicle 10 equipped with a fuel cell system 12 including a fuel cell stack 22, the fuel cell stack including a plurality of power generation cells 50 stacked together, the power generation cells 50 generating electric power by an electrochemical reaction of a fuel gas and an oxygen-containing gas, the fuel cell vehicle 10 being configured to travel by electric power generated by the fuel cell system 12. The fuel cell vehicle 10 includes a stop prediction unit 202 configured to predict a time point t3 of occurrence of a stop state of the fuel cell system 12, during traveling; and a drying state control unit 204 configured to start (perform) a drying state control that causes the fuel cell stack 22 to transition to a dry state, a predetermined time (required drying time) Tp before the predicted time point t3 of occurrence of the stop state.

According to the present invention, if the time point t3 of occurrence of a stop state of the fuel cell system 12 is predicted during driving, control for causing the fuel cell stack 22 to transition to a dry state is started a predetermined time (required drying time) Tp before the predicted time point t3 of occurrence of the stop state. Thus, it is possible to eliminate the need for the post-stop drying process (post-stop power generation process) of the fuel cell vehicle 10, or alternately to significantly reduce the time required for the post-stop drying process (post-stop power generation process).

It should be noted that the present invention is not limited to the above-described embodiment, and it goes without saying that various configurations can be adopted based on the contents described in this specification, such as (1) changing the required drying time Tp in accordance with the magnitude of the impedance Zm during normal control, and (2) integrating the ECU 30 and the navigation control unit 220.

What is claimed is:

1. A method of stopping a fuel cell vehicle equipped with a fuel cell system including a fuel cell stack, the fuel cell stack including a plurality of power generation cells stacked together, the power generation cells generating electric power by an electrochemical reaction of a fuel gas and an oxygen-containing gas, the fuel cell vehicle being configured to travel by electric power generated by the fuel cell system in an ON state of a power switch of the fuel cell vehicle, the method comprising:
predicting a time point of occurrence of a stop state of the fuel cell system by transition of the power switch from the ON state to an OFF state during traveling; and
starting a drying state control that causes the fuel cell stack to transition to a dry state, a predetermined time point before the predicted time point of occurrence of the stop state, and causes an impedance of the fuel cell stack to reach a target impedance at a time point which allows for a margin time to elapse before the predicted time point of occurrence of the stop state.

2. The method of stopping the fuel cell vehicle according to claim 1,
further comprising:
predicting the time point of occurrence of the stop state of the fuel cell system, based on a route learning result by a navigation device.

3. The method of stopping the fuel cell vehicle according to claim 1,
further comprising:
predicting the time point of occurrence of the stop state of the fuel cell system, based on destination information of a navigation device.

4. The method of stopping the fuel cell vehicle according to claim 1, further comprising:
when the time point of occurrence of the stop state is predicted, notifying an occupant that the drying state control is to be performed, before start of the drying state control.

5. The method of stopping the fuel cell vehicle according to claim 1, wherein
the drying state control comprises performing:
a heater energization process of energizing electric heaters that are respectively provided inside end plates of the fuel cell stack to warm up the fuel cell stack.

6. A fuel cell vehicle equipped with a fuel cell system including a fuel cell stack, the fuel cell stack including a plurality of power generation cells stacked together, the power generation cells generating electric power by an electrochemical reaction of a fuel gas and an oxygen-containing gas, the fuel cell vehicle being configured to travel by electric power generated by the fuel cell system in an ON state of a power switch of the fuel cell vehicle,
the fuel cell vehicle comprising:
one or more processors that execute computer-executable instructions stored in a memory, wherein the one or more processors execute the computer-executable instructions to:
predict a time point of occurrence of a stop state of the fuel cell system by transition of the power switch from the ON state to an OFF state during traveling; and
start a drying state control that causes the fuel cell stack to transition to a dry state, a predetermined time point before the predicted time point of occurrence of the stop state, and causes an impedance of the fuel cell stack to reach a target impedance at a time point which allows for a margin time to elapse before the predicted time point of occurrence of the stop state.

* * * * *